US011463857B2

(12) United States Patent
Amaral Costa et al.

(10) Patent No.: US 11,463,857 B2
(45) Date of Patent: Oct. 4, 2022

(54) APPARATUS FOR SECURE LOCAL ACCESS TO AN ASSET AND VALIDATION WITH A MOBILE DEVICE, SYSTEM COMPRISING IT AND METHOD

(71) Applicant: AtoBe—Mobility Technology, S.A., São Domingos de Rana (PT)

(72) Inventors: Andre Amaral Costa, São Domingos de Rana (PT); Antonio Fernando Guerra Lopes Amador, São Domingos de Rana (PT); Manuel Maximiano Relvas Do Nascimento, São Domingos de Rana (PT); Mario Miguel De Sousa Santos De Oliveira Rodrigues, São Domingos de Rana (PT)

(73) Assignee: ATOBE—MOBILITY TECHNOLOGY, S.A., São Domingos de Rana (PT)

( * ) Notice: Subject to any disclaimer, the term of this patent is extended or adjusted under 35 U.S.C. 154(b) by 46 days.

(21) Appl. No.: 16/767,603

(22) PCT Filed: Nov. 28, 2018

(86) PCT No.: PCT/IB2018/059398
§ 371 (c)(1),
(2) Date: May 28, 2020

(87) PCT Pub. No.: WO2019/106557
PCT Pub. Date: Jun. 6, 2019

(65) Prior Publication Data
US 2021/0067935 A1    Mar. 4, 2021

(30) Foreign Application Priority Data
Nov. 30, 2017 (PT) .......................... 110432

(51) Int. Cl.
*H04B 7/00* (2006.01)
*H04W 4/80* (2018.01)
(Continued)

(52) U.S. Cl.
CPC ............ *H04W 4/80* (2018.02); *H04B 17/318* (2015.01); *H04W 4/021* (2013.01); *H04W 12/0433* (2021.01); *H04W 12/06* (2013.01)

(58) Field of Classification Search
CPC ... H04W 4/80; H04W 12/0433; H04W 4/021; H04W 12/06; H04B 17/318
(Continued)

(56) References Cited

U.S. PATENT DOCUMENTS 7,027,773 B1 * 4/2006 McMillin ................ H04L 45/00
455/445
7,324,804 B2 * 1/2008 Hrastar ................. H04L 67/025
370/461
(Continued)

FOREIGN PATENT DOCUMENTS

EP    2991041 A2    3/2016

*Primary Examiner* — April G Gonzales
(74) *Attorney, Agent, or Firm* — Mark M. Friedman

(57) ABSTRACT

The present invention is enclosed in the area of local access and validation, specifically by means of wireless systems. It is an object of the present invention an apparatus (1) for secure local access and validation with a mobile device (10), comprising wireless communication means and proximity detection means, and configured to issue a wireless beacon (S1) comprising an identification, detect a first proximity value (S2a) and a second proximity value (S2b) of said mobile device (10), such second value on receipt of an at least one wireless message issued by the mobile device (10), and being further configured to, based on said first proximity value and second proximity value, determine a detected proximity (S3) and cause an action to initiate (S4) based on such detected proximity. Such apparatus (1) provides for
(Continued)

secure and simplified identification of a mobile device (10), for access purposes. A system comprising such apparatus (1) and a mobile device (10), and an associated method are also part of the present invention.

18 Claims, 1 Drawing Sheet

(51) Int. Cl.
*H04B 17/318* (2015.01)
*H04W 12/0433* (2021.01)
*H04W 4/021* (2018.01)
*H04W 12/06* (2021.01)

(58) Field of Classification Search
USPC .................................................. 455/41.2
See application file for complete search history.

(56) References Cited

U.S. PATENT DOCUMENTS

| | | | |
|---|---|---|---|
| 7,734,293 B2* | 6/2010 | Zilliacus | H04W 36/0066 455/448 |
| 8,560,012 B2* | 10/2013 | Ohnishi | G08C 17/00 455/448 |
| 10,009,745 B2* | 6/2018 | Somani | H04W 4/80 |
| 2004/0209617 A1* | 10/2004 | Hrastar | H04W 24/00 455/434 |
| 2012/0003933 A1* | 1/2012 | Baker | A61B 5/14542 455/41.2 |
| 2013/0217332 A1* | 8/2013 | Altman | G01S 1/02 455/3.01 |
| 2015/0171926 A1* | 6/2015 | Coelho | H04B 5/0025 455/41.2 |
| 2015/0237462 A1* | 8/2015 | Han | H04W 4/80 455/404.1 |
| 2015/0257104 A1* | 9/2015 | Choi | H04W 52/0229 455/41.3 |
| 2015/0341440 A1* | 11/2015 | Nelson | G06F 21/51 455/41.2 |
| 2015/0341744 A1* | 11/2015 | Nelson | H04W 4/025 455/41.2 |
| 2015/0350820 A1* | 12/2015 | Son | H04W 12/03 455/41.2 |
| 2015/0351008 A1* | 12/2015 | Mayor | H04W 48/16 455/41.2 |
| 2016/0055693 A1* | 2/2016 | Somani | G07C 9/28 340/5.61 |
| 2016/0057565 A1* | 2/2016 | Gold | H04W 4/023 455/41.1 |
| 2016/0066127 A1* | 3/2016 | Choi | H04W 4/80 455/41.2 |

\* cited by examiner

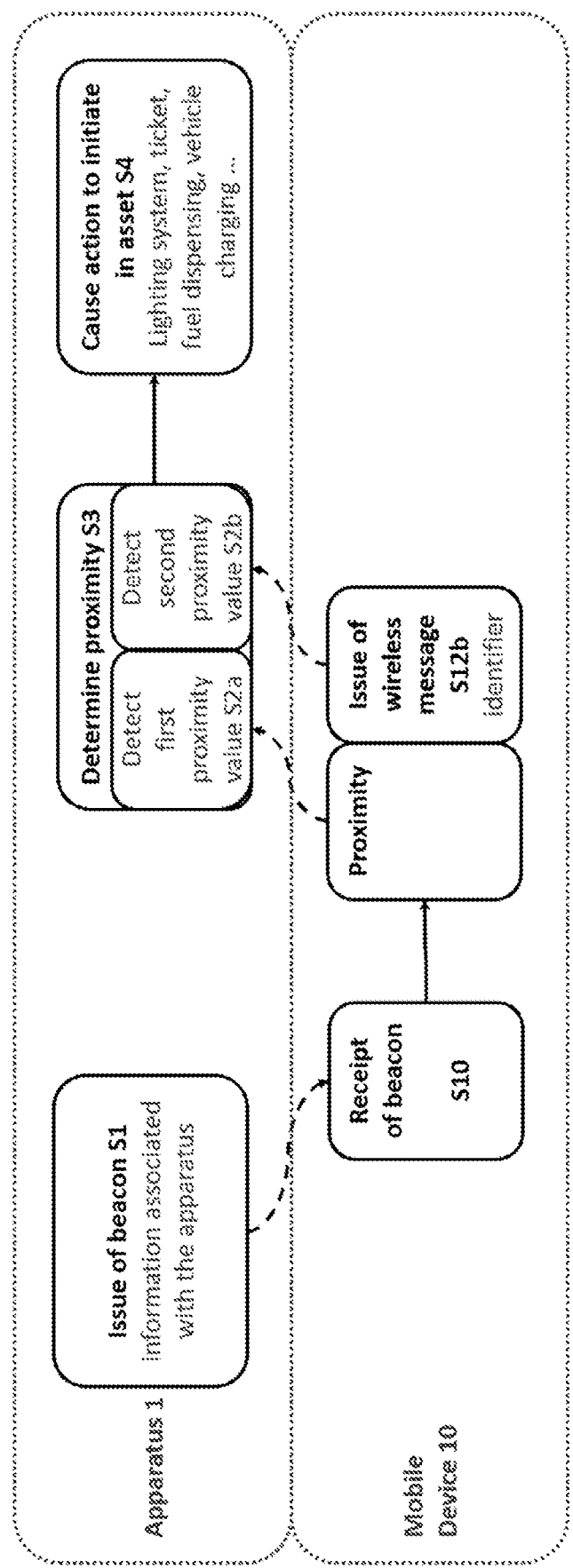

APPARATUS FOR SECURE LOCAL ACCESS TO AN ASSET AND VALIDATION WITH A MOBILE DEVICE, SYSTEM COMPRISING IT AND METHOD

FIELD OF THE INVENTION

The present invention is enclosed in the area of local access and validation, specifically by means of wireless systems.

PRIOR ART

Solutions exist in the art where validation or access to a certain asset is provided by means of a smartphone in communication with a local device, such local device issuing a wireless beacon, by means of the Bluetooth protocol or equivalent, which the smartphone detects and uses to gain knowledge and access to the asset, this link being intrinsically related with the location of the local device and the asset. In such case the two devices are typically a few meters of distance from each other.

Alternatively, systems exist where validation or access to a certain asset provided also by means of a smartphone in communication with a local device, such communication being based on the Near Field Communication (NFC) protocol or equivalent, in which the smartphone gains knowledge and access to the asset by means of near communication (a few centimetres) with the NFC enabled local device. Alternatively, the scheme may be less elaborated, and physical detection of a mobile device is obtained by means of a capacitive sensor, with no data transfer capability.

However, the existing solutions have several issues. In the case of a Bluetooth enabled communication, and in a several mobile device situation, it is hard to identify which of such mobile devices is the one to which access should be granted, and under which conditions. Further, it may be the case that several local devices providing the access are in a same vicinity. That either brings issues in the identification of a mobile device by a local device providing access or leads to high complexity in providing means to overcome the issues.

Alternatively, in the case of near communication (such as NFC), the mobile device will have to be very near to the local device (centimetre range) so that communication may initiate. It thus forces the mobile device to be in constant proximity with the local device so that communication exists.

The present solution innovatively overcomes such issues and brings additional enhancements, as described below. The present invention provides simplified and secure communication, enabling communication between a local apparatus and a mobile device within an acceptable several meter wide range, with a distance-based discrimination criterion.

SUMMARY OF THE INVENTION

It is therefore an object of the present invention an apparatus (1) for secure local access to an asset and validation with a mobile device (10), such apparatus (1) comprising wireless communication means and proximity detection means, and being configured to:
  i) issue a wireless beacon (S1), periodically, through the wireless communication means, and comprising an information associated with the apparatus,
  ii) detect a first proximity value (S2a) of said mobile device (10) via said proximity detection means,
  iii) detect a second proximity value (S2b) of said mobile device (10) via said wireless communication means, on receipt of an at least one wireless message issued by the mobile device (10), the apparatus (1) being further configured to, based on said first proximity value and second proximity value, determine a detected proximity (S3) and cause a certain action to initiate (S4), in an asset, based on such detected proximity. Said information associated with the apparatus (1) preferably comprises, even more preferably consists of, an identifier associated with the apparatus. Optionally, such identifier comprises information associated with said asset, such as its location.

Such apparatus (1) therefore provides for secure and simplified identification of a mobile device (10), preferably for access purposes. The apparatus (1) comprises two proximity detection means, one of such means consisting of wireless communication means and another, based on proximity detection, where the combination of the two provides for an additional way of securing that the mobile device (10) which is in communication with the apparatus (1) is indeed in the proximity of such apparatus. Thus, the proximity detection means may consist of simplified detection means, which typically do not provide for an accurate measure or data-transfer capability, yet ensuring that the mobile device (10) is indeed in the vicinity of the apparatus. On the other hand, the use of the wireless communication means for communication and proximity detection with a mobile device (10) provides the indication that it is the same mobile device (10) that sends the wireless message and is close to the apparatus. Thus, this combination of proximity detection means provides for a secure and simplified manner of detecting and validating a mobile device (10), thereby causing an action to occur. As subsequently described, possible actions consist of turning on a lighting system or validating a digital ticket associated with the mobile device. Such actions may be physical and/or logical.

Further, the wireless communication protocol enables communication between the apparatus (1) and a mobile device (10) within an acceptable several meter wide range, not restraining any sort of communication, be it of proximity detection or any other, to a centimetre wide range. The apparatus (1) and the mobile device (10) may exchange communication other than for proximity purposes. For example, the proximity of the mobile device (10) may be detected and such mobile device (10) then moves away from the apparatus, subsequently changing additional communication such as sending certain commands for causing an action to occur through/by means of the apparatus.

Specifically, the apparatus (1) is further configured so that the action is only caused to initiate on receipt of a further command from the mobile device.

In an advantageous embodiment of the apparatus (1) of the present invention, said proximity detection means comprise a proximity sensor, optionally a capacitive sensor, or near communication means, optionally based in the Near Field Communication protocol (NFC). Thus, it is ensured that the mobile device (10) may detect and communicate with the apparatus (1) at a larger distance, via the wireless communication means, and then combine the nearby detection of the above referred proximity detection means with that of the wireless communication means, obtaining the above-mentioned advantages. The proximity sensor configuration provides a simple and reliable manner of detecting the physical presence of a mobile device (10), as its simplicity in combination with the detection of the second proximity value provides for an additionally simplified and yet reliable embodiment.

In another advantageous embodiment of the apparatus (1) of the present invention, combinable with the above, the wireless beacon and the received wireless message are of a same wireless communication protocol. Thus, an additionally simplified and efficient solution is obtained, in which the communication protocol used for announcing the presence of the apparatus (1) is the same with which the proximity of a mobile device (10) is determined.

In yet another advantageous embodiment of the apparatus (1) of the present invention, combinable with the above, the wireless communication means are configured to determine the second proximity value of said mobile device (10) via Radio Signal Strength Indicator (RSSI) of said wireless message, measured as received in the wireless communication means. The measurement of RSSI provides a higher device independency, when compared to the case in which transmission power is measured by the mobile device.

In yet another advantageous embodiment of the apparatus (1) of the present invention, combinable with the above, it is further configured to only cause said certain action to initiate where the received wireless message from the mobile device (10) comprises a pre-specified identification. Thus, such pre-specified identification works as a known key, which enables access to the action to initiate. Additionally, in an enhanced mode of such embodiment, said pre-specified identification consists of a unique key which encrypts the wireless message, preferably such unique key consisting of a public key, and the apparatus (1) decrypting the wireless message with a private key, the private key and the public key consisting of a key pair associated with the apparatus, thereby providing for a way to not only identify the mobile device (10) as secure but also to provide additional protection of the wireless communication. Furthermore, the backend server may send to the mobile device (10) a list of commands correspondent to the action caused to initiate in the asset associated with said apparatus.

In another inventive aspect of the apparatus (1) of the present invention, combinable with the above, the wireless communication means and proximity detection means are installed within a minimum distance from each other, preferably in a same enclosure, even more preferably in two different print circuit boards (PCB) displaced in parallel. Since both the proximity detection means and wireless communication means provide for the detected proximity, its disposal in a same physical area enhances the determination of such detected proximity, which takes into consideration both values. The mounting in two different print circuit boards (PCB) displaced in parallel provides for additional physical stability and proximity.

It is also an object of the present invention a system for secure local access to an asset and validation with a mobile device (10), such system comprising the apparatus (1) of the present invention as of any of the described embodiments and at least one mobile device (10), such mobile device (10) being configured to issue a wireless message (S12b) directed to the apparatus (1) subsequently to the wireless beacon issued (S1) by such apparatus.

In an inventive aspect of such system, it further comprises a backend server, such backend server:
  comprising at least one database in turn comprising said unique key, and
  being configured so that, on receipt of a message issued by the mobile device (10) and such message comprising:
    an identifier of the mobile device (10) and
    the information associated with the apparatus (1) comprised in the wireless beacon issued by the apparatus,
  the backend server sends a message to the mobile device (10) comprising said unique key,
and the mobile device (10) is further configured to send said message to the backend server on receipt of the wireless beacon from the apparatus (S10).

This embodiment of the system provides for a security chain which links information which is previously defined— the unique key which is associated with the apparatus (1)—with the mobile device (10), such mobile device (10) only having access to such unique key when providing the information associated with the apparatus (1) obtained via wireless beacon, thus when close to the apparatus.

Alternatively, said unique key is securely transferred to the mobile device (10), thereby the mobile device (10) being configured to, on receipt of the wireless beacon from the apparatus (S10), send said wireless message comprising a pre-specified identification. Said pre-specified identification therefore consists of the unique key, which is a public key which encrypts the sent wireless message. The apparatus (1) decrypts the wireless message with a private key, the private key and the public key consisting of a key pair associated with the apparatus, thereby providing for a way to not only identify the mobile device (10) as secure but also to provide additional protection of the wireless communication.

In yet another advantageous embodiment of the system of the present invention, it comprises a plurality of apparatuses (1), the mobile device (10) is configured to determine a proximity to each of said apparatuses (1) and, based on said proximity to each of said apparatuses (1), determine the information associated with the apparatus (1) comprised in the wireless beacon issued by the apparatus (1) to be included in the message sent to the backend server. Such embodiment permits the mobile device (10) to select which of such apparatus (1) is the nearest one based on said proximity. This apparatus (1) is the correct one that the mobile device (10) should communicate with, in order to proceed with the said proximity detection procedure.

It is also an object of the present invention a method for secure local access to an asset and validation with a mobile device. Such method may be defined through the several embodiments of the apparatus (1) and system as above described.

Preferably, such method comprises the following steps:
a) issue of a wireless beacon (S1), periodically, by an apparatus (1) through wireless communication means, and such beacon comprising an information associated with the apparatus (1),
b) detection of a first proximity value (S2a) of said mobile device (10) by said apparatus (1), via proximity detection means,
c) issue of an at least one wireless message (S12b) by the mobile device (10),
d) detection of a second proximity value (S2b) of said mobile device (10) via said wireless communication means, on receipt of said wireless message issued,
e) determination of a detected proximity (S3) by the apparatus (1), based on said first proximity value and second proximity value,
f) causing of a certain action to initiate (S4), in an asset, based on such detected proximity.

Thus, providing the above-mentioned secure and simplified identification of a mobile device (10) are obtained, preferably for access purposes.

In an inventive aspect of such method, the wireless beacon and the received wireless message are of a same wireless communication protocol. As above referred for the apparatus (1) of the present invention, such embodiment provides for an even more simplified and yet equally efficient solution.

In an advantageous aspect of such method, said certain action is only caused to initiate where the received wireless message from the mobile device (10) comprises a pre-specified identification, preferably said pre-specified identification consisting of an unique key which encrypts the wireless message, preferably such unique key consisting of a public key, and the apparatus (1) decrypting the wireless message with a private key, the private key and the public key consisting of a key pair associated with the apparatus. Thus, it provides for a way to not only identify the mobile device (10) as secure but also to provide additional protection of the wireless communication.

In yet another advantageous aspect of such method, it further comprises the steps of:
 on receipt of the wireless beacon (S10) of step a), issue of a message by the mobile device (10) and directed to a backend server, such message comprising:
  an identifier of the mobile device (10) and
  the information associated with the apparatus (1) comprised in the wireless beacon issued by the apparatus,
 on receipt of the message of the previous step, issue of a reply message by the backend server and directed to the mobile device (10), such reply message comprising said unique key.

As above referred for the corresponding feature of the system of the present invention, this embodiment of the system provides for a security chain which links information which is previously defined the unique key which is associated with the apparatus (1) with the mobile device (10), such mobile device (10) only having access to such unique key when providing the information associated with the apparatus (1) obtained via wireless beacon, thus when close to the apparatus.

DESCRIPTION OF FIGURES

FIG. 1 representation of an embodiment of the method of the present invention, which represents such method in terms of the relationship between the apparatus (1) and the mobile device (10).

DETAILED DESCRIPTION

The more general and advantageous configurations of the present invention are described in the Summary of the invention. Such configurations are detailed below in accordance with other advantageous and/or preferred embodiments of implementation of the present invention.

Regarding the determination of the detected proximity, the apparatus (1) is configured so that the referred certain action is caused to initiate when the detected proximity is within a pre-defined interval, preferably when the first proximity value is within a pre-defined interval of physical proximity detection and the second proximity value is within a pre-defined value of radio frequency signal strength measurement. A preferred example consists of capacitance and RSSI, respectively.

In a preferred embodiment of the apparatus (1) of the present invention, said wireless communication protocol consists of a wireless local area network protocol preferably based in the Bluetooth protocol, more preferably Bluetooth Low Energy (BLE).

In a preferred embodiment of the system of the present invention, the backend server and the mobile device (10) are configured to communicate via a wireless network, preferably Wi-Fi or a cellular network, more preferably 2.5G, 3G, 4G or 5G. Thus, the apparatus (1) may even not be connected to, e.g. the Internet, consisting of a simplified device merely providing access to an action on a certain identification of a mobile device (10), the mobile device (10) containing such communication capabilities.

Alternatively, the backend server and the mobile device (10) are configured to communicate through the apparatus. In such case, the mobile device (10) is securely pre-configured with said unique key. In such case, the apparatus (1) further comprises local or wide area network means, configured to communicate with the backend server. In such case, the backend server sends to the mobile device (10), through the apparatus, the list of commands correspondent to the action caused to initiate in the asset associated with such apparatus.

In another aspect of the system of the present invention, it further comprises an access device, such access device being connected to the asset in which the action is caused to initiate based on said detected proximity, the asset consisting preferably of one of the following:
 a door with a lock, the action caused to initiate being the opening or closing of the lock,
 a lighting system, the action caused to initiate being the turning on or off of such lighting system,
 a gate, optionally a parking barrier or a public transport gate, the action caused to initiate being the grant the access through the barrier or gate, preferably opening or closing,
 a ticket validation device, the action caused to initiate being the actuation of validation signalling, preferably a light and/or a sound,
 a car washing machine, the action caused to initiate being the initiation or stoppage of the procedure of the car washing machine,
 a fuel pump, the action caused to initiate being the dispensing or stoppage of dispensing of fuel,
 means for charging an electrical vehicle, the action caused to initiate consisting of initiating the charging process of an electrical vehicle.

As is above described through the several possibilities, the described apparatus (1) and system comprising it are quite versatile, enabling several different implementations. The communication between the apparatus (1) and the access device is supported by a combination of means, preferably Ethernet, RS-232 or RS-485 serial connections and/or dry contacts.

Within the present application, Bluetooth is to be understood as any version and protocol under the wireless technology commonly known as Bluetooth, to which the standard IEEE 802.15.1 is associated. Bluetooth Low-Energy consists of the protocol known as such within the scope of specification 4.0 and subsequent of Bluetooth protocol.

Within the present application, Near Field Communication is to be understood as any version and protocol under the wireless technology commonly known as NFC, to which the standards ISO/IEC 18092/ECMA-340 Near Field Communication Interface and Protocol-1 (NFCIP-1) and ISO/IEC 21481/ECMA-352 Near Field Communication Interface and Protocol-2 (NFCIP-2) are associated.

Within the present application, Wife is to be understood as any version and protocol under the wireless technology commonly known as Wi-Fi, to which the standard IEEE 802.11 is associated. The same applies to the Ethernet, RS-232 e RS-485, to be understood as any version and protocol under the communication technologies commonly known as Ethernet, RS-232 and RS-485, respectively, and to which standards IEEE 802.3, TIA/EIA RS 232 and TIA/EIA RS-485, respectively, are associated.

As will be clear to one skilled in the art, the present invention should not be limited to the embodiments described herein, and a number of changes are possible which remain within the scope of the present invention.

Of course, the preferred embodiments shown above are combinable, in the different possible forms, being herein avoided the repetition all such combinations.

The invention claimed is:

1. An apparatus for secure local access to an asset and validation with a mobile device, comprising wireless communication means and proximity detection means, the apparatus being configured to:
   i) issue a wireless beacon, periodically, through the wireless communication means, and comprising an information associated with the apparatus,
   ii) detect a first proximity value of said mobile device via said proximity detection means,
   iii) detect a second proximity value of said mobile device via said wireless communication means, on receipt of an at least one wireless message issued by the mobile device,
   the apparatus being further configured to, based on said first proximity value and second proximity value, determine a detected proximity and cause a certain action to initiate, in an asset, based on such detected proximity, wherein the wireless communication means and proximity detection means ae installed within a minimum distance from each other, wherein the wireless communication means and proximity detection means are installed in a same enclosure, preferably in two different print circuit boards (PCB) displaced in parallel.

2. The apparatus according to claim 1, wherein said proximity detection means comprise a proximity sensor, optionally a capacitive sensor, or near communication means, optionally based in the Near Field Communication protocol (NFC).

3. The apparatus according to claim 1 wherein said wireless communication protocol consists of a wireless local area network protocol, preferably based in the Bluetooth protocol, more preferably Bluetooth Low Energy (BLE).

4. The apparatus is according to claim 3 wherein the wireless beacon and the received wireless message ae of a same wireless communication protocol.

5. The apparatus according to claim 3, wherein the wireless communication means are configured to determine the second proximity value of said mobile device via Radio Signal Strength Indicator (RSSI) of said wireless message, measured as received in the wireless communication means.

6. The apparatus according to claim 1 wherein it is further configured to only cause said certain action to initiate where the received wireless message from the mobile device comprises a pre-specified identification.

7. The apparatus according to claim 6 wherein said pre-specified identification consists of an unique key which encrypts the wireless message, preferably such unique key consisting of a public key, and the apparatus decrypting the wireless message with a private key, the private key and the public key consisting of a key pair associated with the apparatus.

8. The apparatus according to claim 1 wherein it is further configured so that maid certain action is caused to initiate when maid detected proximity is within a pre-defined interval, preferably when the rust proximity value is within a pre-defined interval of physical proximity detection and the second proximity value is within a pre-defined value of radio frequency signal strength measurement.

9. The apparatus according to claim 1 wherein it is further configured so that the action is only caused to initiate on receipt of a further command from the mobile device.

10. A system for secure local access to an asset and validation with a mobile device, comprising an apparatus for secure local access to an asset and validation with a mobile device, the apparatus comprising wireless communication means and proximity detection means, the apparatus being configured to:
   i) issue a wireless beacon, periodically, through the wireless communication means, and comprising an information associated with the apparatus,
   ii) detect a rut proximity value of said mobile device via said proximity detection means,
   iii) detect a second proximity value of said mobile device via said wireless communication means, on receipt of an at least one wireless message issued by the mobile device,
   the apparatus being further configured to, based on said first proximity value and second proximity value, determine a detected proximity and cause a certain action to initiate, in an asset, based on such detected proximity, wherein the system further comprises at least one mobile device, such mobile device being configured to issue a wireless message directed to the apparatus subsequently to the wireless beacon issued by such apparatus, the wireless communication means and proximity detection means an installed within a minimum distance from each other, wherein the wireless communication means and proximity detection means are installed in a same enclosure, preferably in two different print circuit boards (PCB) displaced in parallel.

11. The system according to claim 10 wherein it further comprises a backend server, such backend server:
   comprising at least one database in turn comprising said unique key, and
   being configured so that, on receipt of a message issued by the mobile device and such message comprising:
      an identifier of the mobile device and
      the information associated with the apparatus comprised in the wireless beacon issued by the apparatus,
   the backend server sends a message to the mobile device comprising said unique key,
   and the mobile device is further configured to send said message to the backend server on receipt of the wireless beacon from the apparatus.

12. The system according to claim 10 wherein the backend server and the mobile device are configured to communicate via a wireless network, preferably Wi-fi or a cellular network, more preferably 2.5G, 3G, 4G or 5G.

13. The system according to claim 10 wherein it further comprises an access device, such access device being connected to the asset in which the action is caused to initiate based on said detected proximity, the asset consisting preferably of one of the following:

a door with a lock, the action caused to initiate being the opening or closing of the lock, a lighting system, the action caused to initiate being the turning on or off of such lighting system, a gate, optionally a parking barrier or a public transport gate, the action caused to initiate being the grant the access through the barrier or gate, preferably opening or closing, a ticket validation device, the action caused to initiate being the actuation of validation signalling, preferably a light and/or a sound, a car washing machine, the action caused to initiate being the initiation or stoppage of the procedure of the car washing machine, a fuel pump, the action caused to initiate being the dispensing or stoppage of dispensing of fuel, means for charging an electrical vehicle, the action caused to initiate consisting of initiating the charging process of an electrical vehicle.

14. The system according to claim 10 further comprising a plurality of apparatuses, the mobile device is configured to determine a proximity to each of said apparatuses and, based on said proximity to each of said apparatuses, determine the information associated with the apparatus comprised in the wireless beacon issued by the apparatus to be included in the message sent to the backend server.

15. A method for secure local access to an asset and validation with a mobile device, comprising the following steps:
   a) issue of a wireless beacon, periodically, by an apparatus through wireless communication means, and such beacon comprising an information associated with the apparatus,
   detection of a first proximity value of said mobile device by said apparatus, via proximity detection means,
   c) issue of an at least one wireless message by the mobile device,
   d) detection of a second proximity value of said mobile device via said wireless communication means, on receipt of said wireless message issued,
   e) determination of a detected proximity by the apparatus, based on said first proximity value and second proximity value,
   f) causing of a certain action to initiate, in an asset, based on such detected proximity
   wherein the wireless communication means and proximity detection means ae installed within a minimum distance from each other, wherein the wireless communication means and proximity detection means are installed in a same enclosure, preferably in two different print circuit board (PCB) displaced in parallel.

16. The method according to claim 15 wherein the wireless beacon and the received wireless message ae of a same wireless communication protocol.

17. The method according to claim 15 wherein said certain action is only caused to initiate where the received wireless message from the mobile device comprises a pre-specified identification, preferably said pre-specified identification consisting of an unique key which encrypts the wireless message, preferably such unique key consisting of a public key, and the apparatus decrypting the wireless message with a private key, the private key and the public key consisting of a key pair associated with the apparatus.

18. The method according to claim 15 wherein it further comprises the steps of:
   on receipt of the wireless beacon of step a, issue of a message by the mobile device and directed to a backend server, such message comprising:
      an identifier of the mobile device and
      the identification of the apparatus comprised in the wireless beacon issued by the apparatus,
   on receipt of the message of the previous step, issue of a reply message by the backend server and directed to the mobile device, such reply message comprising said unique key.

* * * * *